US007865530B2

(12) United States Patent
Liu et al.

(10) Patent No.: US 7,865,530 B2
(45) Date of Patent: Jan. 4, 2011

(54) CONSTRUCTING AND MAINTAINING A PERSONALIZED CATEGORY TREE, DISPLAYING DOCUMENTS BY CATEGORY AND PERSONALIZED CATEGORIZATION SYSTEM

(75) Inventors: Shi Xia Liu, Beijing (CN); Li Ping Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 616 days.

(21) Appl. No.: 11/188,194

(22) Filed: Jul. 22, 2005

(65) Prior Publication Data

US 2006/0020588 A1 Jan. 26, 2006

(30) Foreign Application Priority Data

Jul. 22, 2004 (CN) ................. 2004 1 0054631

(51) Int. Cl.
*G06F 7/00* (2006.01)
*G06F 17/30* (2006.01)
(52) U.S. Cl. ...................... 707/797; 707/732
(58) Field of Classification Search ............... None
See application file for complete search history.

(56) References Cited

U.S. PATENT DOCUMENTS 5,644,764 A * 7/1997 Johnson et al. ......... 707/103 R
6,002,750 A * 12/1999 Ertz ...................... 379/88.12
6,014,662 A * 1/2000 Moran et al. ................ 1/1
6,047,284 A * 4/2000 Owens et al. ............... 1/1
6,055,540 A * 4/2000 Snow et al. ................ 1/1
6,216,134 B1 * 4/2001 Heckerman et al. ....... 707/749
6,223,145 B1 * 4/2001 Hearst .................... 703/22
6,345,252 B1 * 2/2002 Beigi et al. .............. 704/272
7,162,540 B2 * 1/2007 Jasen et al. .............. 709/242
2002/0032672 A1 * 3/2002 Keith, Jr. ................. 707/2

FOREIGN PATENT DOCUMENTS

WO WO02/097671 A2 12/2002

OTHER PUBLICATIONS

Unsupervised and Supervised Clustering for Topic Tracking (NAACL-2001) by Martin Franz, et al., pp. 310-317.*

* cited by examiner

*Primary Examiner*—Charles Rones
*Assistant Examiner*—Daniel Kuddus
(74) *Attorney, Agent, or Firm*—Michcael J. Buchenhorner; Vazken Alexanian

(57) ABSTRACT

The present invention provides methods, systems and apparatus: for constructing a personalized category tree; for maintaining a personalized category tree; for displaying documents by category by utilizing a personalized category tree; and a personalized categorization system. A personalized category tree is a category tree that includes at least one category node. A method for constructing a personalized category tree includes: the independent creation of each of said at least one category node comprises the steps of: defining a label for the category node; and specifying at least one keyword for the category node.

12 Claims, 10 Drawing Sheets

CONSTRUCTING AND MAINTAINING A PERSONALIZED CATEGORY TREE, DISPLAYING DOCUMENTS BY CATEGORY AND PERSONALIZED CATEGORIZATION SYSTEM

TECHNICAL FIELD OF THE INVENTION

The present invention relates to data processing technologies, more specifically, to the technology of constructing a personalized category tree and categorizing documents by utilizing the personalized category tree.

BACKGROUND OF THE INVENTION

Both for enterprises and individuals, there exists the problem of categorizing and storing the information documents they own. Especially for those enterprises which own a great deal of information documents and individuals who need to process various documents, it will certainly be advantageous to their working efficiency that these documents be stored orderly according to their categories. Now, many statistical categorization methods have been successfully applied in real world document categorization, such as Support Vector Machine (SVM), K-Nearest Neighbor (KNN), Decision Tree, Naive Bayesian, and etc. With these statistical methods, precision and recall of document categorization can reach to more than 85%.

With traditional document categorization technologies, before categorizing documents, a category tree is defined by a domain expert, and each category node in the category tree is defined with a training set of manually labeled documents. A corresponding categorizer is then constructed by utilizing the set of training documents. And finally, the documents to be categorized are automatically categorized with the categorizer. However, the precision of the traditional categorization method depends on the number and quality of training samples available in the training set.

In the article "A re-examination of text categorization methods", Proceedings of ACM SIGIR Conference on Research and Development in Information Retrieval (SI-GIR'99, pp 42-49), 1999 by Yiming Yang and Xin Liu, five statistical categorization methods, including SVM (Support Vector Machine), KNN (K-Nearest Neighbor), LLSF (Linear Least-Squares Fit), NN (Neural Network) and NB (Naive Bayesian) methods, have been tested. As recorded in the article, the tests with Reuters-21578 showed that for categories containing more training samples (more than 300 training samples), the precision and recall of the above methods is significantly good, while for categories containing fewer training samples (fewer than 10 training samples), the precision and recall of the above methods is quite poor.

In real practice, the distribution of training samples among various categories of a category tree is often not even, with some category nodes only having a few training samples. According to the statistics in the article, with the ApteMod version, the most common (commonly used) category is "earn", having 2,877 training documents, but 82% of the categories have less than 100 instances, and 33% of the categories have less than 10 instances. As recorded in the article, the test results with the above methods showed that their performances are function of the training-set category frequency. For those categories with training document size less than 10, its macro-averaging F measure only achieves less than 0.2, while for those categories with training-set frequency more than 2000, its macro-averaging F measure can reach to 0.9 or more. From this, we can see that, in case of small training set, statistical methods cannot work very well.

Furthermore, all the above algorithms are based on a pre-defined and well-structured category tree, of which each category has been manually configured with tens or hundreds training samples. However, regardless of the sophistication of the pre-defined category tree, it is highly unlikely that any particular category tree defined by an expert can fully satisfy the degree of detail required by a user. In most cases, an ordinary user would treat a category tree as his file folder hierarchy in the hard disk, and hope to be able to manage the category tree in the same customized and personalized manner as a file folder. Therefore, a general application system should allow a user to arbitrarily define his personalized category tree, and in such a category tree, the user should also be allowed to introduce inconsistency in semantics. For example, at first, the user defines a sub-tree:

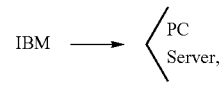

and wants to put documents related to IBM products into this sub-tree, i.e. put documents related to IBM PC into the category "PC" and documents related to IBM Server into the category "Server". But, with the passage of time, the user may want to collect some documents about DELL PC into the category "PC". However, this operation will introduce semantic inconsistency into this personalized category tree. Traditional categorization methods cannot introduce the documents about DELL PC of semantic inconsistency into the category "PC", and thus cannot realize such a personalized category tree.

Therefore, a user may desire to be able to create arbitrarily a personalized category tree that is similar to his file folder hierarchy, and map freely a semantic structure that meets his demands onto this personalized category tree, without being limited by traditional semantic consistency, and at the same time, may also desire that there be no need to perform manually the work of specifying a great deal of training samples, which is lengthy, and time and energy-consuming, thereby realizing personalized document categorization that can satisfy personal needs.

SUMMARY OF THE INVENTION

Therefore, in order to solve the above mentioned problems in the prior art, the present invention provides methods, systems and apparatus for constructing and maintaining a personalized category tree, and displaying documents by category using the personalized category tree and a personalized categorization system. This, thereby enables a user to perform personalized document categorization by defining a personalized category tree that satisfies his personal needs, without having to manually label the set of training documents and considering the problem of semantic inconsistency.

According to one aspect of the present invention, there is provided a method for constructing a personalized category tree, the personalized category tree is a category tree that includes at least one category node, the step of creating independently each of the at least one category node comprising: defining a label for the category node; and specifying at least one keyword for the category node. By default, the label for the category is a keyword for the category.

According to another aspect of the present invention, there is provided a method for constructing a personalized category tree, the personalized category tree is a tree that includes at least one category node, the step of creating each of the at least one category node comprising: searching for documents using at least one keyword; selecting at least one document from the search results; defining a label for the category node; specifying the keyword used in the searching step as the keyword for the category node; and specifying the selected at least one document as the feature document for the category node.

According to another aspect of the present invention, there is provided methods for maintaining a personalized category tree.

According to another aspect of the present invention, there is provided a method for displaying documents by category using personalized category tree.

According to another aspect of the present invention, there is provided a personalized categorization system, comprising: category tree editor for creating and modifying a personalized category tree.

BRIEF DESCRIPTION OF THE DRAWINGS

The features, advantages and purposes of the present invention will be better understood from the following description of the detailed implementations of the present invention taken in conjunction with the accompanying drawings, in which.

DETAILED DESCRIPTION OF THE INVENTION

Figure 1:
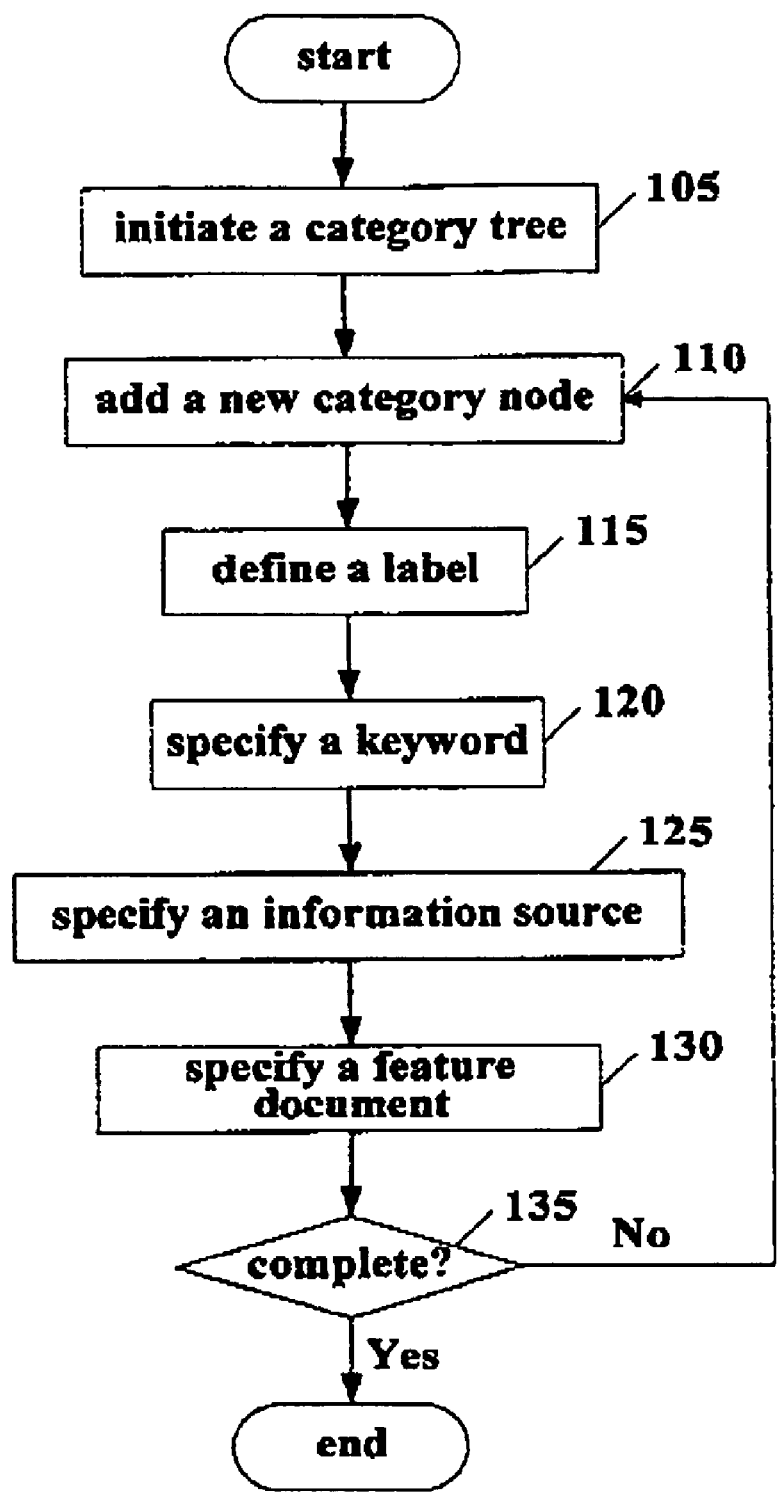
FIG. 1 is a flowchart of a method for constructing a personalized category tree according to one embodiment of the present invention.

The present invention provides methods, systems and apparatus for constructing and maintaining a personalized category tree, and displaying documents by category using the personalized category tree and a personalized categorization system. This, enables a user to perform personalized document categorization by defining a personalized category tree that satisfies his personal needs, without having to labeling manually the set of a great deal of training document and considering the problem of semantic inconsistency.

In an example embodiment of the present invention, there is provided a method for constructing a personalized category tree. The personalized category tree is a category tree that includes at least one category node. The step of creating independently each of the at least one category node comprising: defining a label for the category node; and specifying at least one keyword for the category node. By default, the label for the category is a keyword for the category.

In an example embodiment of the present invention, there is provided a method for constructing a personalized category tree, the personalized category tree is a tree that includes at least one category node, the step of creating each of the at least one category node comprising: searching for documents using at least one keyword; selecting at least one document from the search results; defining a label for the category node; specifying the keyword used in the searching step as the keyword for the category node; and specifying the selected at least one document as the feature document for the category node.

In another example embodiment of the present invention, there is provided a method for maintaining a personalized category tree, the personalized category tree is a category tree that includes at least one category node, each of the at least one category node includes a label and at least one keyword, the method comprising: for each of the at least one category node, searching for documents using the at least one keyword included in the category node; selecting at least one document from the search results as the feature document for the category node; and performing topic tracking to add documents relevant to the category node based on the at least one feature document.

In another example embodiment of the present invention, there is provided a method for maintaining a personalized category tree, the personalized category tree is a category tree that includes at least one category node, each of the at least one category node includes a label, at least one keyword and at least one feature document, the method comprising: for each of the at least one category node, performing topic tracking to add documents relevant to the category node based on the at least one feature document.

In another example embodiment of the present invention, there is provided a method for displaying documents by category using personalized category tree, the personalized category tree is a tree that includes at least one category node, each of the at least one category node includes a label and relevant documents belonging to the category node, the method comprising: selecting a category node in the personalized category tree; and displaying the relevant documents belonging to that category node.

In another example embodiment of the present invention, there is provided a personalized categorization system. The system includes: a category tree editor for creating and modifying a personalized category tree, wherein the personalized category tree is a category tree that includes at least one category node, each of the at least one category node includes a label and at least one keyword; and a category node editor for configuring a category node in the personalized category tree.

Next, various preferred embodiments of the present invention will be described in detail in conjunction with accompany drawings. As mentioned above, in traditional document categorization methods, a category tree is constructed by a domain expert, and a set of a great deal of training documents are selected for each category in the category tree, and thereby the training sets are utilized to perform semantic identification for new documents in order to assign the new documents into the respective categories in the category tree. Such a category tree complies with the semantic consistency requirement, not allowing a user to introduce semantic inconsistencies. Further, such a category tree that has been defined by an expert presents great difficulty for a user to create his own personalized categories, because the user will have to select a great deal of training documents for the new categories defined, and this is difficult for an ordinary user who is not a language expert, moreover, the accuracy of categorization cannot be assured. Therefore, if a user can construct a personalized category tree according to his own needs, and utilize that tree to automatically categorize and manage documents with no or few training samples, the user will be spared of a lot of burdensome work of document management.

Traditional category tree organizes various documents and the relationships between them in the form of a tree, in which a parent node and a child node form a containment relationship, there is a strict semantic qualification relationship between them, they are dependent on each other during training, and the qualification of the child node includes the semantic qualification of the parent node, that is, the parent node includes all the documents belonging to the child node. This ensures semantic consistency in the category tree. Whereas in the present invention, the parent node and the child node are separately and independently qualified, their semantics are relatively independent, and it is through different views, document organization/customization/filtering to satisfy a user's needs for browsing and searching for documents. That is, in a category tree according to the present invention, while the form of the path organization of a parent node and a child node suggests a parent-child relationship, the qualifications and contents of the parent node and the child node are independent of each other.

Method for Constructing a Personalized Category Tree

According to one aspect of the present invention, there is provided a method for constructing a personalized category tree. Below, the method will be described in detail in conjunction with accompany drawings.

FIG. 1 is a flowchart of a method for constructing a personalized category tree according to one embodiment of the present invention. A personalized category tree of the present invention allows semantic inconsistency, so, when constructing a personalized category tree, there is no need to consider the consistency problem between a child node and a parent node, each category node being created with same steps.

As shown in FIG. 1, with the start of the method for constructing a personalized category tree of the present embodiment, first at Step 105, initialization is performed to create a category tree that only contains the root node.

Next at Step 110, a category node is added into the personalized category tree.

Next at Step 115, a label is defined for that new category node. The label should be able to represent category features of the node, similar to the name of a file folder.

Next at Step 120, at least one keyword is specified for that new category node. Preferably, the label for the category may serve as a keyword for the category. The keywords for a category node are used to describe the topic content of that category node, and as described later, the keywords can be utilized to find documents relevant to the category node and the feature documents for the category node.

Next at Step 125, an information source is specified for that new category node. The information source is used to indicate the source of relevant documents of the category node, and may be, for example, an URL, a path, an IP address or a computer name, etc. Notably, a category node can be specified with either one information source or multiple information sources, and multiple category nodes can share one information source. When a new category node has not been specified with an information source, that category node inherits the information source of its parent node by default.

Next at Step 130, at least one feature document is specified for the new category node. In the present invention, a feature document is a document that is highly relevant to the category node and can best represent the content of the category, equivalent to training samples in the traditional categorization methods. But the difference with the traditional methods is that the number of feature documents of the present invention can be much more smaller than the number of training samples in the traditional categorization methods (for example, user may only need to select 3 to 5 samples), thereby saving the time of a user specifying the feature documents.

Next at Step 135, it is determined whether the task of constructing the personalized category tree has been accomplished, and if a new category node still needs to be added, and then return to Step 110, repeating the above described Step 110 to 130 to add the new node onto the personalized category tree.

If the determination in Step 135 is that the constructing task has been accomplished, then the method ends at Step 140.

In employing the method of the present embodiment for constructing a personalized category tree, since there is no need to consider the consistency between a parent node and a child node, each category node can be created simply and equally, so it can be done conveniently even by ordinary user who is not a language expert. In addition, according to the present implementation, a user needs not to specify a great deal of training samples, thereby reducing the workload.

Further, according to a variation of the present embodiment, Step 125 and/or Step 130 can be omitted, that is, information source and feature documents are not specified for each node. Wherein, the same information source can be specified for the whole category tree or a child node can use the information source of its parent node, and the feature documents can be selected during the process of maintaining the personalized category tree as described later. Alternatively, the information source is not specified, but the information source to which the user can or is authorized to access is regarded as the information source for the node, and the feature documents may also not be selected, but the documents that the user frequently accesses are used as the feature documents, or only the keywords are used to perform categorization. Thus, the workload of constructing a personalized category tree by a user can be further saved.

Figure 2:
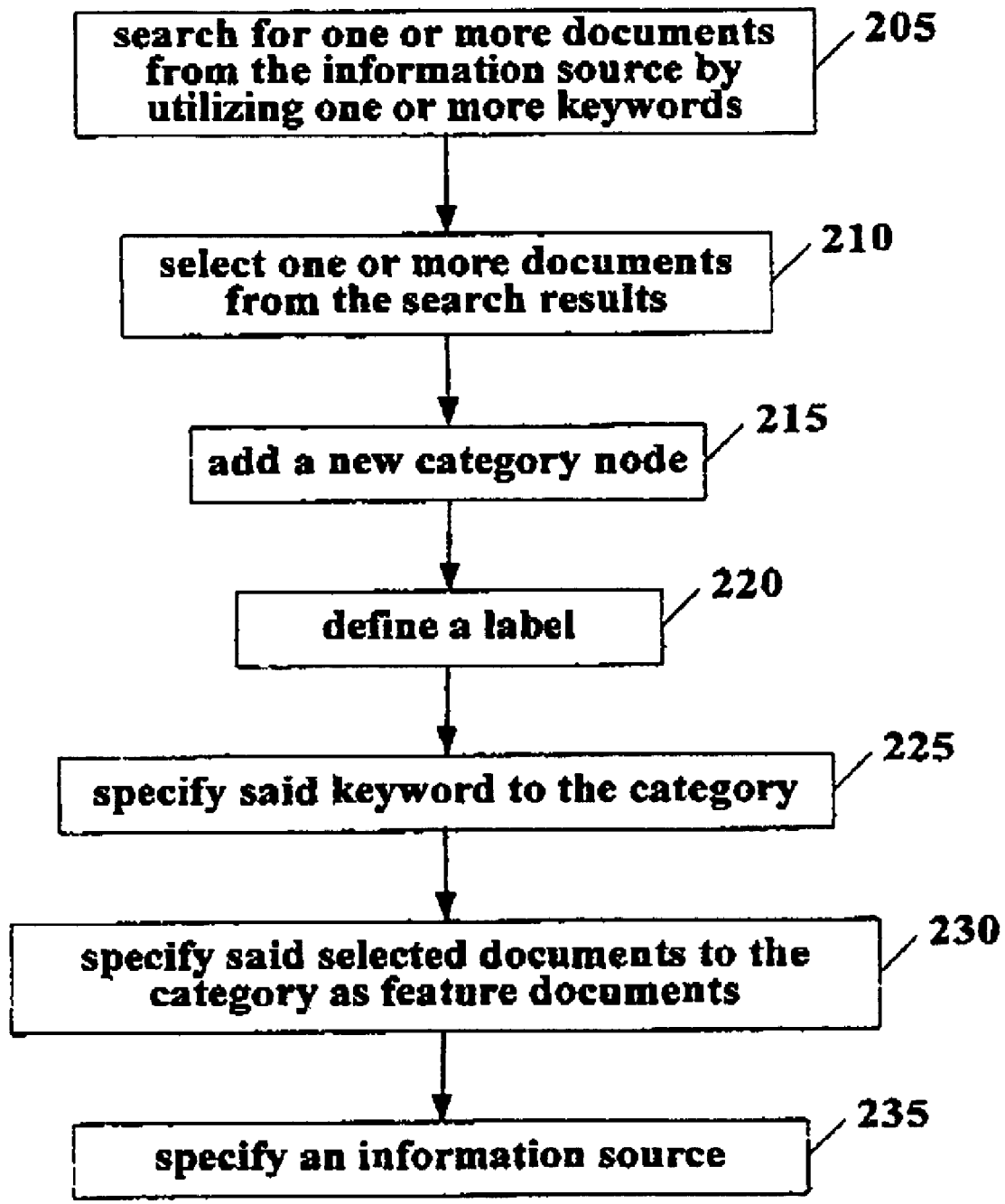
FIG. 2 is a flowchart of a method for constructing each node in a personalized category tree according to another embodiment of the present invention.

FIG. 2 is a flowchart of a method for constructing each node in a personalized category tree according to another embodiment of the present invention. The method for constructing a personalized category tree in the present embodiment differs from the method for constructing a personalized category tree in the above embodiment in that the process of creating each category node is different. The creation of each category node in a personalized category tree in the present embodiment is accomplished simultaneously when a user retrieves documents.

As shown in FIG. 2, first at Step 205, the user searches for documents from the information source by utilizing one or more keywords. Specifically, the user can utilize the keyword(s) to find documents that include the keyword(s) in a local or network path, or, for example, the user can enter keywords in a search engine to query relevant documents.

Next at Step 210, at least one document is selected from the search results of the previous step. Specifically, the user can select one or more desired documents by browsing the abstract or the body text of each document found.

Next at Step 215, a category node is added into the personalized category tree. The user can add the category node at any desired location in the personalized category tree.

Next at Step 220, a label is defined for the category node to label the category.

Next at Step 225, the keywords used for the search in Step 205 are specified as the keywords for that category node.

Next at Step 230, the documents selected in Step 210 are specified as the feature documents for that category node.

Next at Step 235, an information source is specified for that category node. The information source may be a path used to find the documents in the previous Step 205, or may be the URL or path of the documents found in case that the user has performed the query through a search engine. Naturally, multiple information sources can also be specified for the category node, for example, when the documents found are from different locations.

The method of constructing a personalized category tree of the present embodiment has been described above in conjunction with accompanying drawings 1 and 2. It is noted that when adding a new node, the child node can inherit the attributes of its parent node, such as the information source, the keywords, etc., and common attributes, such as the information source, can be set for the category tree.

From the above description it can be seen that, since each category node in a category tree is created separately according to the respective needs during constructing the category tree, the category nodes are equal to and independent of each other, so the personalized category tree constructed with the above embodiments does not have the problem of semantic constraints between the category nodes, thereby allowing semantic inconsistencies. In addition, because no or only a few feature documents need to be specified for each category node, rather than specifying the set of a great deal of training samples by a language expert as with a traditional category tree, the process of constructing a category tree is greatly simplified, saving a great deal of manpower and precious time.

Further, because information sources can be specified for each category node respectively and one category node can have multiple information sources in the personalized category tree, it is even more convenient for a user to manage documents using a personalized category tree.

In addition, in the previous embodiment, the work of adding a new category node into a personalized category tree can be accomplished simultaneously when a user's document, thereby combining together the retrieval and the creation of the personalized category tree by the user, further simplifying the user's work.

Method for Maintaining a Personalized Category Tree

In the same inventive conception, according to another aspect of the present invention, there is provided a method for maintaining a personalized category tree, which may be generated with, for example, the above described method for constructing a personalized category tree. The method will be described below in conjunction with accompany drawings.

Figure 3:
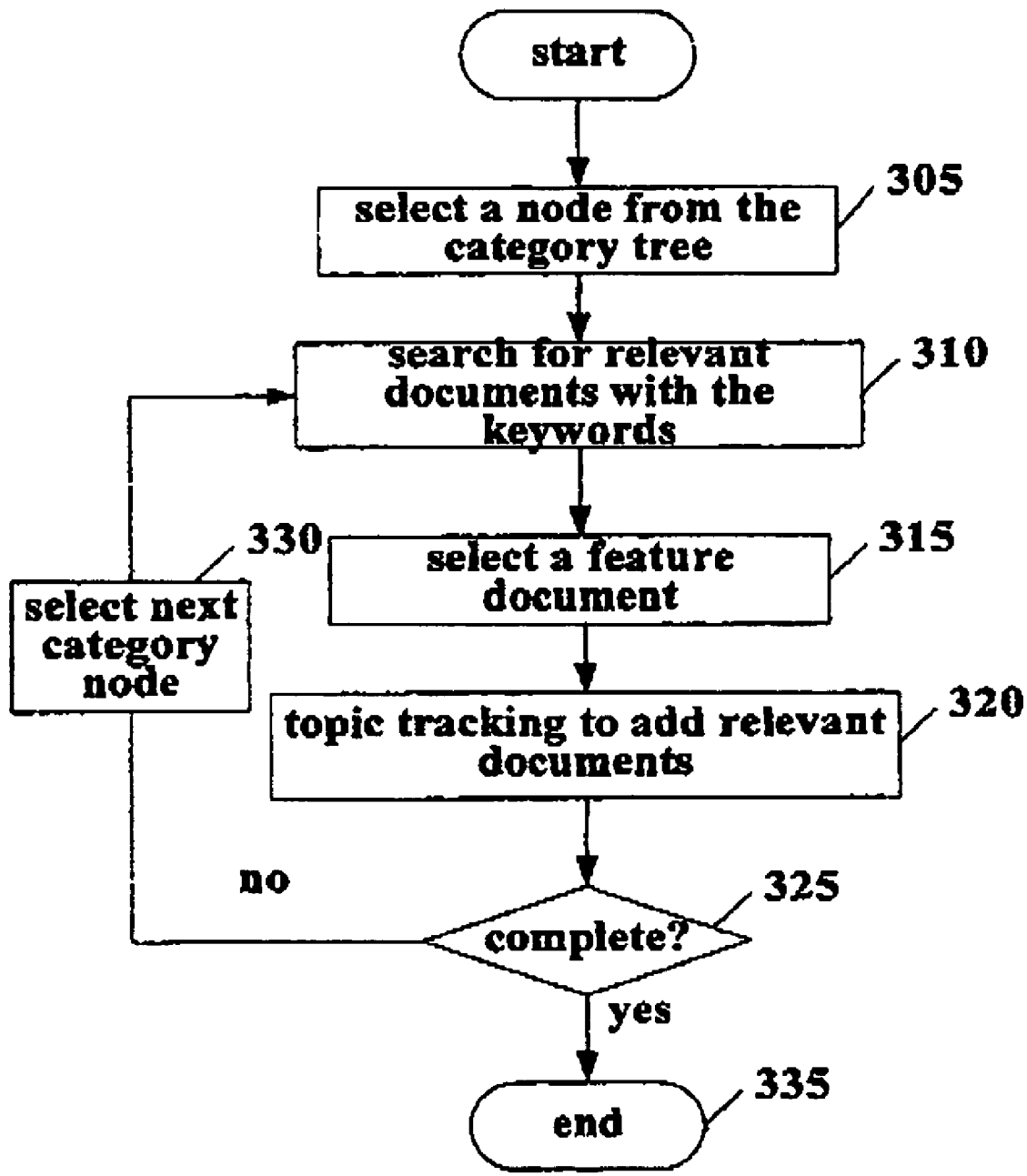
FIG. 3 is a flowchart of a method for maintaining a personalized category tree according to one embodiment of the present invention.

FIG. 3 is a flowchart of a method for maintaining a personalized category tree according to one embodiment of the present invention. It should be pointed out that the present embodiment applies to a personalized category tree that is generated by the above described method for constructing a personalized category tree, and includes at least one category node, each category node including a label, at least one keyword and an information source used to indicate the source of relevant documents of the category node.

As shown in FIG. 3, first at Step 305, a category node is selected from the personalized category tree. Because a parent node and a child node in a personalized category tree in present invention are relatively independent and have no strict semantic constraint relationship, the category nodes can be selected for processing one by one in any order, such as depth-first or width-first or another order, when maintaining the personalized category tree.

Next at Step 310, for the selected category node, the keywords are used to search for relevant documents from the information source specified for the category node.

Next at Step 315, at least one document is selected from the search results in the previous step as the feature document for the category node.

Next at Step 320, topic tracking is performed on the documents in the information source specified for the category node according to the at least one feature document, to add relevant documents of the category node.

There are various methods for topic tracking in the prior art, such as those proposed in the article "Unsupervised and Supervised Clustering for Topic Tracking" (NAACL-2001) by Martin Franz, et al., and those in the article "NIST's 1998 Topic Detection and Tracking Evaluation (TDT2)" (issued in Proceedings of the DARPA Broadcast News Workshop, 1999) by J. G. Fiscus, et al., all of which are incorporated herein in their entirety for reference. The tracking method will be described in detail in conjunction with accompany drawings hereinafter.

Next at Step 325, it is determined whether the maintaining work for the personalized category tree has been accomplished, and if there is any other node needing to be maintained in the personalized category tree, the method proceeds to Step 330. At Step 330, the next category node that needs to be maintained in the personalized category tree is selected, and the method returns to Step 310 and repeats above described Step 310 to Step 325.

If the determination at Step 325 is that all nodes have been processed, then the method ends at Step 335.

In addition, according to a variation of the present embodiment, the category nodes in the personalized category tree has already been specified feature documents, so during the process of maintaining the node, Step 310 and Step 315 can be omitted, and the topic tracking can be performed directly according to the specified feature documents. In addition, according to another variation of the present embodiment, an information source has not been specified for each category node in the personalized category tree, thus during the process of maintaining the node, document finding and/or topic tracking can be performed on documents in a common information source.

Figure 4:
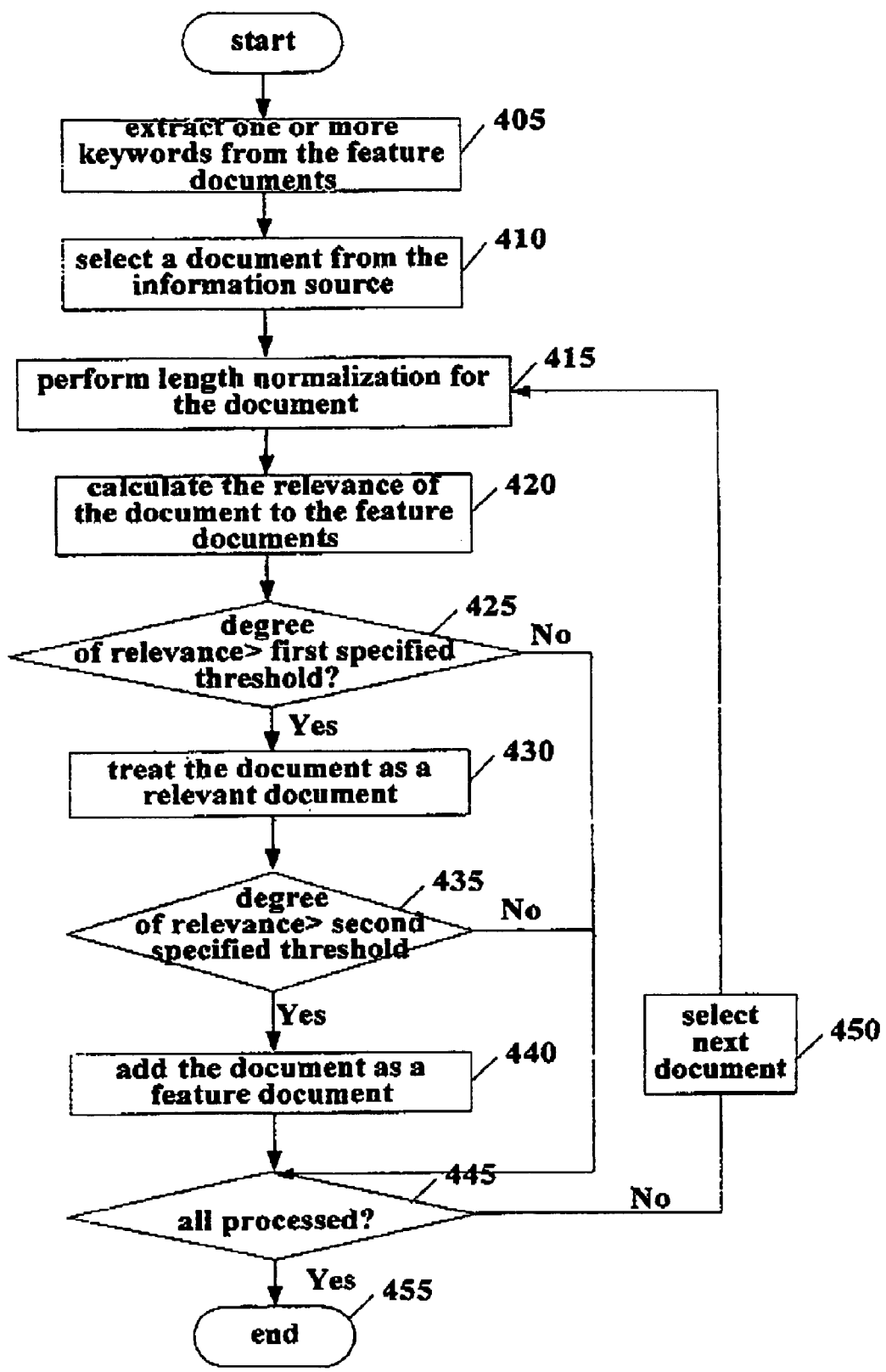
FIG. 4 is a flowchart illustrating detailed steps of performing topic tracking for a category node to retrieve relevant documents in a method for maintaining a personalized category tree according to one embodiment of the present invention.

FIG. 4 shows the detailed steps of performing topic tracking for a category node to retrieve relevant documents in the method for maintaining a personalized category tree according to one embodiment of the present invention.

As shown in FIG. 4, first at Step 405, at least one keyword is extracted from the feature documents of the category node. Specifically, it can be done using, for example, the tf (term frequency) method or the tf-idf (term frequency-inverse document frequency) method, etc. The tf method ranks and calculates the weight according to the number of times each keyword appears in the document. Whereas the tf-idf method determines the weight of each keyword by calculating tf×idf, wherein tf is the frequency (number of times) the word appears in the document, and idf=all_sentences/term_sentences, wherein all_sentences is the number of all sentences in the document, term_sentences is the number of sentences that include the word. Then, extract one or more keywords with high weight according to the above calculation results.

Next at Step 410, a document is selected from the information source specified for the category node.

Next at Step 415, the at least one keyword extracted from the feature documents and the keywords included in the category node are used to perform document length normalization for the document in the information source of the category node.

Because the structures and lengths of various kinds of documents are different, and sometimes a document will include contents relevant or irrelevant to the desired topic in different parts. In this case, if the degree of topic relevance between the document and the feature documents is calculated directly, often the calculated degree of relevance is very low, thereby missing the relevant documents which ought to be selected. Therefore, in the present embodiment, length normalization is perform on the documents in the information source of the category node by using the keywords extracted from the feature documents as well as the keywords specified for the category node, in order to solve the above problem.

Figure 5:
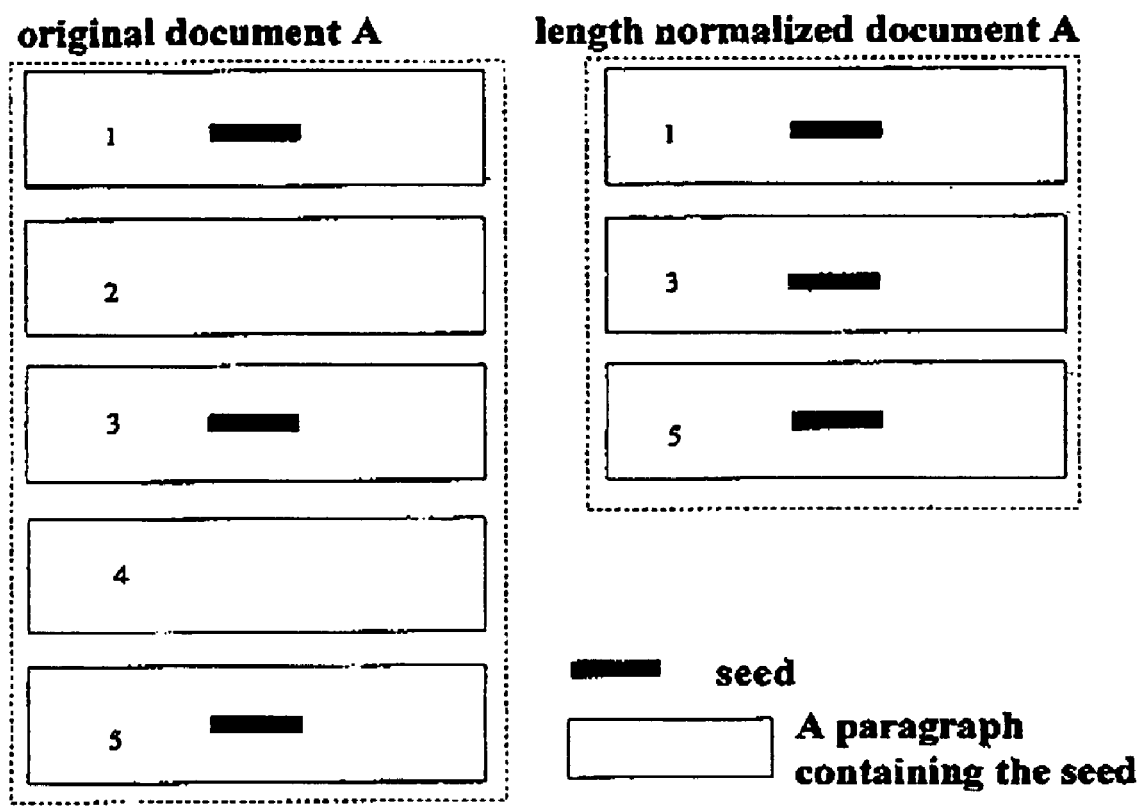
FIG. 5 is a diagram for illustrating document length normalization for a document.

FIG. 5 is a diagram for illustrating document length normalization for a document. As shown in FIG. 5, specifically, the document length normalization for the document is to treat the each of the keywords as a seed. For each seed occurred in the document, the surrounding texts that include the seed from the document are extracted, and here, the basic unit of the surrounding texts extracted is a paragraph that includes the seed in the document. Then, the extracted surrounding texts are combined as the length normalized structure of the document. Thus the parts in the text that are irrelevant to the desired topic are excluded.

Next at Step 420, the degree of topic relevance between the length normalized document and the length normalized feature documents in the category node is calculated.

Specifically, various methods can be used to calculate the degree of topic relevance, such as described in the above mentioned prior art papers. In the present embodiment, Okapi formula is used to calculate the degree of topic relevance between a first document and a second document, that is $$Ok(d^1, d^2) = \sum_{w \in d^1 \cap d^2} t_w^1 t_w^2 \lambda(w, \mu)$$

wherein, $d^1$ represents the first document, $d^2$ represents the second document, $t_w^1$ is the adjusted term frequency of word w in document i, $$t_w^i = \frac{\overline{t_w^i}}{\alpha + \overline{t_w^i}}, \overline{t_w^i}$$

is the term frequency of word w in document i, $\alpha$ is an adjust coefficient for adjusting the difference between the maximum and the minimum value of term frequency; $\mu$ is the feature document set included in the node; $\lambda(w,\mu)=\text{idf}_0(w)+\Delta\lambda(w,\mu)$, $\text{idf}_0(w)$ is the inverse document frequency of word w, $\Delta\lambda(w,\mu)$ is mainly used to compare the degree of similarity between two document sets, the two document sets being: Dw, the set of documents that include the word w; and $\mu$, the set of feature documents included in the category node.

$$\Delta\lambda(w, \mu) = \lambda_0 \frac{2n_{w,\mu}}{n_w + n_\mu},$$

wherein, $n_w$ is the total number of the documents that include word w, $n_\mu$ is the total number of the feature documents included in the category node, and $n_{w\mu}$ is the total number of documents that include word w in the document set $\mu$; $\lambda_0$ is an adjustable proportional coefficient for adjusting the degree of importance of item $\Delta\lambda(w,\mu)$.

Next at Step 425, it is determined whether the degree of topic relevance between the document and the feature documents in the category node is greater than a first specified threshold. The first specified threshold may be, for example, 40%. If the determination is "Yes", then the method proceeds to Step 430, adding the document as a relevant document below into the node; otherwise, the method proceeds to Step 445.

Step 435 is performed after Step 430, determining if the degree of topic relevance between the document and the feature documents in the category node is greater than a second specified threshold, which is greater than the first specified threshold, and may be, for example, 60%. If the determination is "Yes", then the method proceeds to Step 440, adding the document as a feature document of the category node; otherwise, the method proceeds to Step 445.

Then at Step 445, it is determined whether all the documents in the information source of the category node have been processed. If there are still documents to be processed, then the method proceeds to Step 450, selecting the next document in the information source and returning to Step 415, repeating the above described process to process that document; otherwise, the method ends at Step 455.

Further, according to a variation of the present embodiment, document length normalization may not be performed for the document to be processed, therefore, Step 405, 415 can be omitted.

In addition, according to another embodiment of the present invention, during the process of maintaining a personalized category tree, a determination is made as to whether the feature documents in a node is greater than a predetermined number, for example, 100, and if "Yes", the maintenance may be performed using a traditional statistical categorization method.

From the above description it can be seen that the maintenance of a personalized category tree is realized by each category node obtaining relevant documents from the information source directly, therefore, there is no need to consider the problem of semantic constraints between category nodes. And categorization of documents can be performed without specifying any feature document or only specifying a few feature documents.

In addition, in the method of maintaining a personalized category tree of the present embodiment, during maintaining a node, i.e. categorization of documents, the number of feature documents of a category node can be extended continuously, thereby automatically adjusting the topic tracking and gradually increasing the accuracy of document categorization as well.

Further, in the method for maintaining a personalized category tree, when the number of feature documents of a category node in the personalized category tree reaches a predefined number, a traditional categorization method can be used, therefore, the method of the present embodiment can also be used as a complementary method when there are relatively few training samples in a category node in a traditional categorization method.

Method for Displaying Documents by Category by Utilizing a Personalized Category Tree In the same inventive conception, according to another aspect of the present invention, there is provided a method for displaying documents by category by utilizing a personalized category tree.

The method will be described below in conjunction with accompany drawings.

Figure 6:
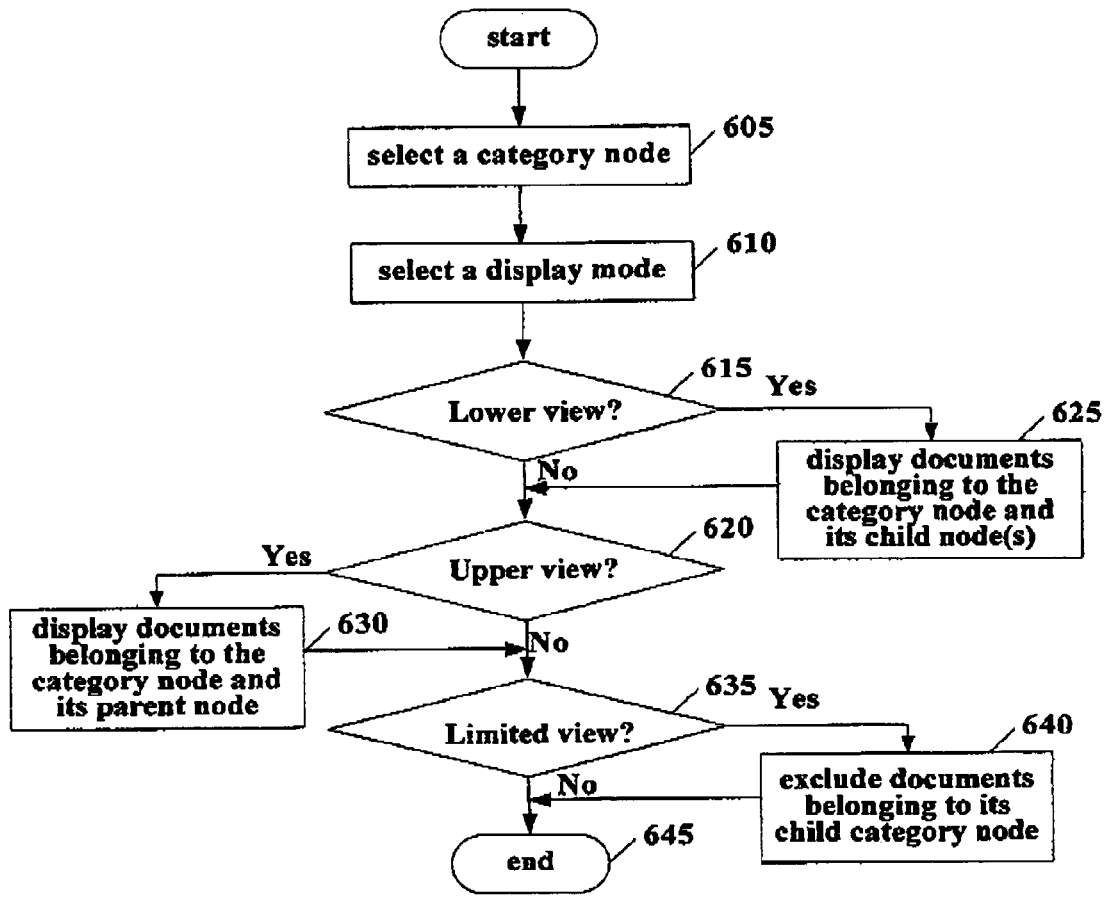
FIG. 6 is a flowchart of a method for displaying documents by category using a personalized category tree according to one embodiment of the present invention.

FIG. 6 is a flowchart of the method for displaying documents by category with a personalized category tree according to one embodiment of the present invention. Wherein the personalized category tree may be, for example, a personalized category tree generated by the above described method for constructing a personalized category tree and maintained by the above described method for maintaining a personalized category tree. The personalized category tree includes at least one category node and each category node includes a label, keywords, feature documents and relevant documents belonging to the category node.

As shown in FIG. 6, first at Step 605, a category node in the personalized category tree is selected.

Figure 7A:
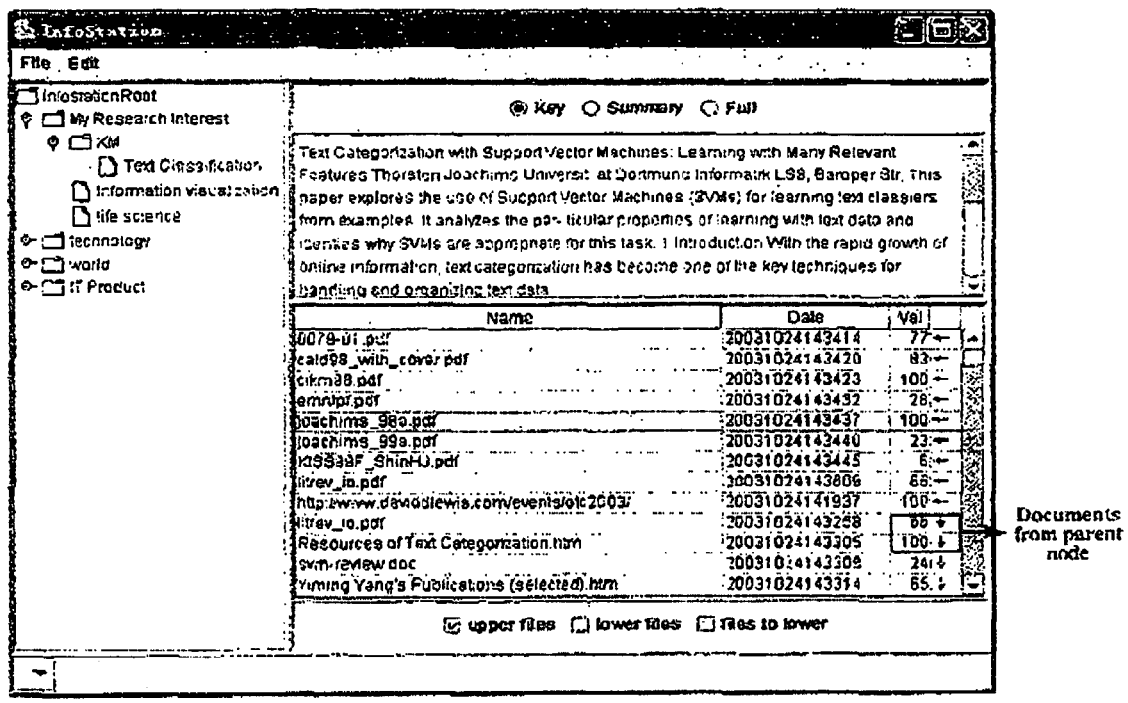
FIGS. 7A-7C shows the results of displaying documents under different displaying modes in a method of displaying documents by category using personalized category tree.
Figure 7B:
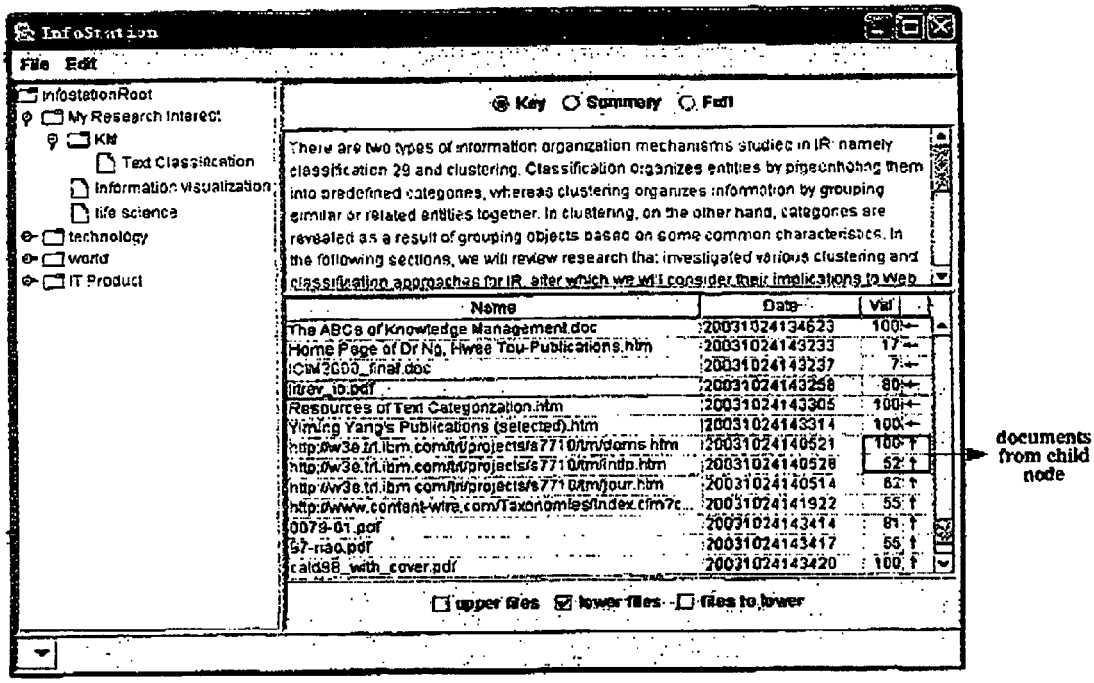
Figure 7C:
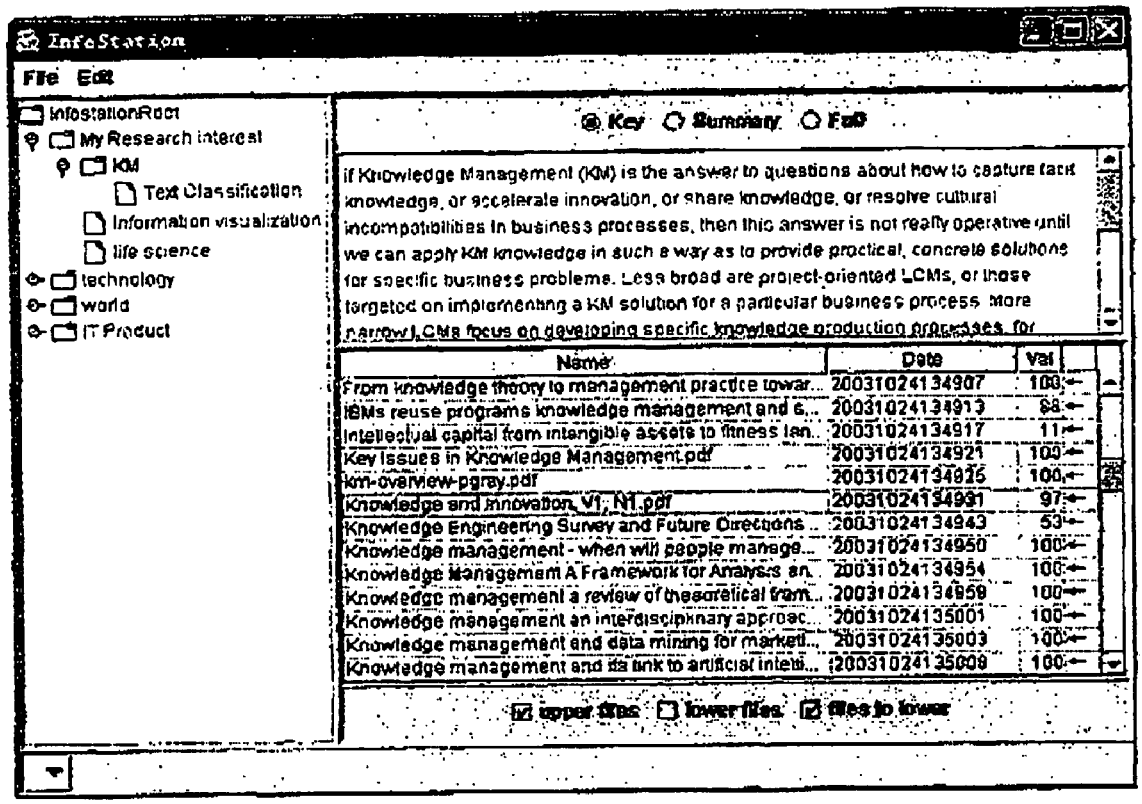

Next at Step 610, a display mode is selected, that is, the user selects the mode for displaying a document with an input device. In the present embodiment, the mode of displaying a document includes: Common view, Lower view, Upper view and Limited view. By default, the relevant documents in a selected category node are displayed to a user in "Common view". Wherein, in "Common view", only the relevant documents belonging to the selected category node will be displayed; in "Lower view", the relevant documents belonging to the selected category node and its child node(s) will be displayed, as shown in FIG. 7B; in "Upper view", the relevant documents belonging to the selected category node and its parent node will be displayed, as shown in FIG. 7A; in "Limited view", the relevant documents belonging to the child node(s) of the category node will be excluded, as shown in FIG. 7C.

It is noted that the above mentioned display modes can be used in combination to display the relevant documents. For example, when "Upper view" and "Limited view" are selected in combination, as shown in FIG. 7C, the documents can be displayed by category with strict semantics as in a traditional category tree.

Specifically, at Step 615, it is determined whether the user has selected "Lower view". If "Yes", then perform Step 625, displaying the relevant documents belonging to the selected category node and its child node(s).

Next at Step 620, it is determined whether the user has selected "Upper view". If "Yes", then Step 630 is performed, displaying the relevant documents belonging to the selected category node and its parent node.

Next at Step 635, it is determined whether the user has selected "Limited view". If "Yes", then Step 640 is performed, excluding the relevant documents belonging to the child node(s) of the category node from the list of the displayed documents.

Finally, the method ends at Step 645. Naturally, the above steps can be performed repeatedly, thereby allowing the user to continually select category nodes to display documents by category.

Further, in the present embodiment, apart from displaying the list of documents that meet the criteria to a user, the abstract information of the selected documents in that list can also be displayed. At the same time, the document list also displays the documents in the order of the degree of relevance between the relevant documents and the feature documents in the category node.

From the above description it can be seen that the method of displaying documents by category with a personalized category tree of the present embodiment may use the above described personalized category tree to display the relevant documents by category. And utilizing the multiple display modes provided in the present embodiment, the relevant documents can be organized in multiple ways for displaying; further, the inconsistency in the personalized category tree can also be remedied.

Personalized Categorization System

In the same inventive conception, according to another aspect of the present invention, there is provided a personalized categorization system. The system will be described below in conjunction with accompany drawings.

Figure 8:
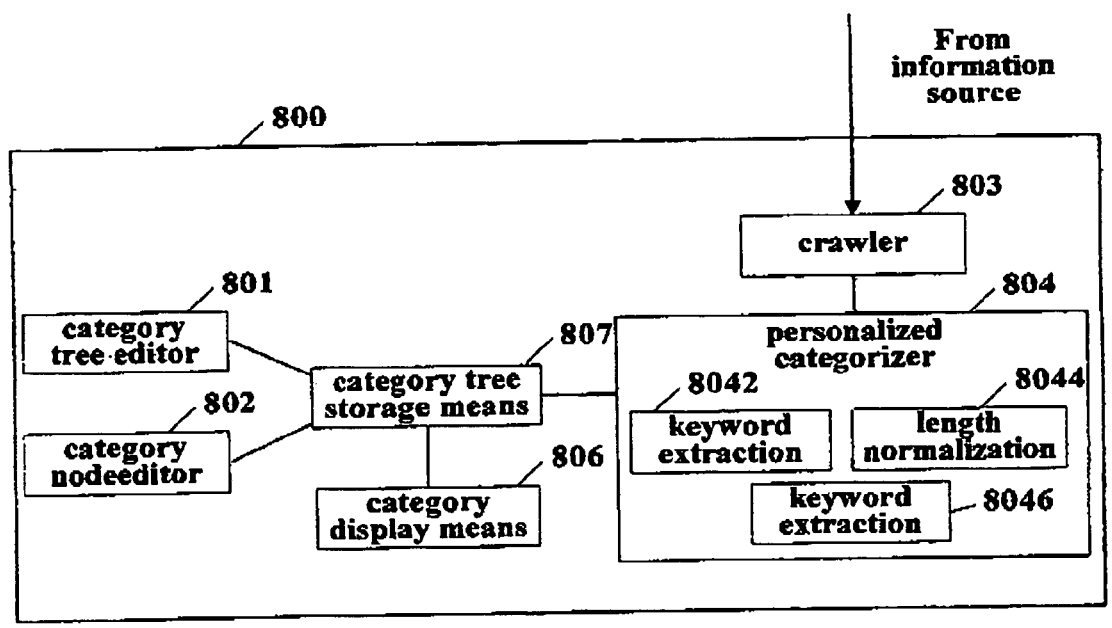
FIG. 8 is a block diagram of a personalized categorization system according to one embodiment of the present invention.

FIG. 8 is a block diagram of a personalized categorization system according to an embodiment of the present invention. As shown in FIG. 8, the personalized categorization system 800 of the present embodiment comprises: a category tree editor 801, a category node editor 802, a crawler 803, a personalized categorizer 804, a category display 806 and a category tree storage device 807.

Wherein, the category tree editor 801 is used to create and modify a personalized category tree, such as add a category node, delete a category node and modify the tree structure, etc.

The category node editor 802 is used to configure the category nodes in the personalized category tree, such as define a label, keywords, feature documents and information source, etc. for a node. When the user has not specified the keywords, feature documents and information source for the category node, the category node editor can inherit the setting of its parent node by default.

The crawler 803 is used to obtain documents from specified information sources. The crawler 803 may be a network crawler known in prior art. When each category node in a personalized category tree has been specified an information source, the crawler 803 can get documents from the information source specified for each category node.

The personalized categorizer 804 is used to categorize the documents obtained by the crawler 803 into the personalized category tree. According to the present embodiment, the personalized categorizer 804 further comprises: a keyword extraction unit 8042, a document length normalization unit 8044 and a relevance calculation unit 8046.

Wherein, the keyword extraction unit 8042 is used to extract keywords from the specified feature documents. The document length normalization unit 8044 is used to perform length normalization on the documents based on the keyword. The relevance calculation unit 8046 is used to calculate the degree of topic relevance between the documents processed and the set of feature documents, for example, by using the above described Okapi algorithm. Further, the personalized categorizer 804 can determine if the documents should be categorized into the node based on the degree of topic relevance, in addition, it can also determine if the relevant documents should be added as feature documents for the node based on its degree of topic relevance.

The category display means 806 is used to display the relevant documents by category by utilizing the personalized category tree. In the present embodiment, the category display means 806 can display the relevant documents in the various display modes described above.

The category tree storage means 807 is used to store the personalized category tree, including: for example, the attribute information in each category node and its relevant documents, feature documents, etc.

From the above description it can be seen that with the personalized categorization system of the present embodiment, the above described method for constructing a personalized category tree, the method for maintaining a personalized category tree and the method for displaying documents by category by utilizing a personalized category tree can be realized.

It should be pointed out that the personalized categorization system of the present invention and its components may be implemented in the form of hardware and software, and may be combined with other devices as needed, for example, it may be implemented on various devices with information processing capabilities, such as a personal computer, a server, a notebook computer, a handhold computer, a PDA, etc. and can be physically separated from and operationally interconnected to each other to function.

Although a method for constructing a personalized category tree, a method for maintaining a personalized category tree, a method for displaying documents by category by utilizing a personalized category tree and a personalized categorization system of the present invention have been described in details through some exemplary embodiments, these embodiments are not exhaustive, and those skilled in the art can make various variations and modifications thereof within the spirit and scope of the present invention. Therefore, the present invention is not limited to these embodiments, and the scope of the present invention is only defined by the appended claims.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention. Methods may be implemented as signal methods employing signals to implement one or more steps. Signals include those emanating from the Internet, etc.

The present invention can be realized in hardware or a combination of hardware and software. A visualization tool according to the present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods can be realized in a centralized fashion in one computer system or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A computer-implemented method of constructing a personalized category tree, said method comprising:

using an information processing device to perform steps of:

allowing semantic inconsistencies in the personalized category tree, wherein each node is independent of each other node;

receiving, at an input device, from a user an arbitrarily defined personalized category tree used for categorizing and storing documents for a computer search, wherein the category tree comprises a plurality of category nodes, a label for each of the category nodes, a keyword used in searching, and a user-introduced inconsistency in semantics introduced into the category tree, wherein each of the category nodes is equal to and independent of each other thereby allowing the semantic inconsistencies;

wherein generating each of said at least one category nodes independently comprises using an information processing device to perform steps of:
defining a label for said category node;
specifying at least one keyword for said category node;
storing in a storage device the arbitrarily defined personalized category tree
said user creating said personalized category tree to be similar to said user's file folder hierarchy;
said user freely mapping a semantic structure that meets said user's demands onto said personalized category tree, without said user being limited by traditional semantic consistency;
satisfying said user's personal needs without said user manually specifying a large amount of training samples; and
realizing said user's personalized document categorization.

2. The method according to claim 1, wherein the creation of each of said at least one category node further comprises specifying at least one feature document for said category node, wherein a feature document is highly relevant to the category node and can best represent the content of the category tree.

3. The method according to claim 2, wherein the creation of each of said at least one category node further comprises specifying at least one information source for said category node indicating the source of relevant documents of said category node.

4. The method according to claim 3, wherein when said category node is a child node, said child node inherits any keyword, any feature document and any information source of a parent node of said child node by default.

5. A computer-implemented method comprising steps of:
maintaining a personalized category tree used to categorize and store documents for a computer search, wherein said personalized category tree is a category tree that includes a semantic inconsistency and at least one category node, and each of said at least one category node includes a label and at least one keyword, said step of maintaining a personalized category tree comprising:
using an information processing device to perform steps of:
allowing semantic inconsistencies in the personalized category tree;
for each of category nodes,
specifying at least one feature document for said category node based on said at least one keyword included in said category node; and
performing topic tracking to retrieve documents relevant to said category node based on said at least one feature document, said step comprising
calculating a degree of topic relevance between each of said at least one document from said information source and said feature document; and
adding said document of which said degree of topic relevance is greater than a first specified threshold as the relevant document into said category node.

6. The method according to claim 5, wherein said step of specifying at least one feature document comprising:
searching for documents by utilizing said at least one keyword included in said category node; and
selecting at least one document from said search results as the feature document for said category node,
wherein semantic inconsistency is accomplished by each parent node and its child node being separately and independently qualified.

7. The method according to claim 6, wherein each of said at least one category node further includes at least one information source indicating the source of relevant documents of said category node, said step of performing topic tracking to add documents relevant to said category node performs topic tracking on the documents from said information source.

8. The method according to claim 7, wherein said step of performing topic tracking to retrieve documents relevant to said category node comprising:
extracting at least one keyword from said at least one feature document;
performing document length normalization for said at least one document from said information source based on said extracted at least one keyword and said at least one keyword included in said category node;
calculating the degree of topic relevance between each of length normalized said at least one document and said length normalized feature document; and
adding said document of which said degree of topic relevance is greater than a first specified threshold as the relevant document into said category node.

9. The method according to claim 5, wherein said degree of topic relevance is calculated with an Okapi formula.

10. The method according to claim 5, wherein further comprising: when the feature documents of said at least one category node are more than a predetermined number, beginning to use a statistical categorization method.

11. A computer-implemented personalized categorization system, comprising:
an information processing device;
a category tree editor for a user creating and modifying an arbitrarily defined personalized category tree used to categorize and store documents for a computer search, wherein said personalized category tree is a category tree that includes at least one category node that allows semantic inconsistency, each of said at least one category node includes a label and at least one keyword; and
a category node editor for configuring the category nodes in said personalized category tree
wherein semantic inconsistency is accomplished by each of the category nodes being equal to and independent of each other and having a limitation taken from a group of limitations consisting of:
further comprising a crawler for obtaining documents from specified information sources, and a personalized categorizer for categorizing the documents obtained by said crawler into said personalized category tree;
wherein each category node in said personalized category tree further includes at least one information source indicating the source of relevant documents of said category node, and said crawler obtains documents from the information source specified for said each category node;
wherein each of said at least one category node further including at least one feature document;
wherein said personalized categorizer further comprises: a keyword extraction unit for extracting keywords from a specified feature document, a document length normalization unit for performing length normalization on a document based on the keywords; and a relevance calculation unit for calculating a degree of topic relevance between the specified document and the set of feature documents;
wherein said relevance calculation unit calculates said degree of topic relevance with an Okapi formula; and further comprising a categorization display means for displaying relevant documents by category by utilizing said personalized category tree;

wherein semantic inconsistency is accomplished by each parent node and its child node being separately and independently qualified.

12. A computer readable storage device comprising a computer having instructions executable by the computer to perform method steps for maintaining a personalized category tree, said method steps comprising:

allowing semantic inconsistencies in the personalized category tree;

maintaining a personalized category tree used to categorize and store documents for a computer search, wherein said personalized category tree is a category tree that includes a semantic inconsistency and at least one category node, and each of said at least one category node includes a label and at least one keyword, said step of maintaining a personalized category tree comprising:

for each of said at least one category node:

specifying at least one feature document for said category node based on said at least one keyword included in said category node; and performing topic tracking to retrieve documents relevant to said category node based on said at least one feature document, said step of performing topic tracking further comprising:

calculating a degree of topic relevance between each of said at least one document from said information source and said feature document; and adding said document of which said degree of topic relevance is greater than a first specified threshold as the relevant document into said category node;

wherein semantic inconsistency is accomplished by each parent node and its child node being separately and independently qualified.

* * * * *